United States Patent [19]

Jeffers

[11] 3,849,874

[45] Nov. 26, 1974

[54] METHOD FOR MAKING A SEMICONDUCTOR STRAIN TRANSDUCER

[75] Inventor: Frederick J. Jeffers, Altadena, Calif.

[73] Assignee: Bell & Howell Co., Chicago, Ill.

[22] Filed: Nov. 1, 1973

[21] Appl. No.: 411,985

Related U.S. Application Data

[63] Continuation-in-part of Ser. No. 276,269, July 28, 1972, Pat. No. 3,805,601.

[52] U.S. Cl. ...................... 29/590, 29/610, 29/25.35

[51] Int. Cl. ............................................. B01j 17/00

[58] Field of Search ............. 29/580, 589, 590, 591, 29/610 G, 594, 595, 25.35; 73/88.5 SD

[56] References Cited

UNITED STATES PATENTS

| | | | |
|---|---|---|---|
| 3,487,541 | 1/1970 | Boswell | 29/591 |
| 3,492,513 | 1/1970 | Hollander | 73/88.5 SD |
| 3,716,429 | 2/1973 | Napoli | 29/580 |
| 3,798,754 | 3/1974 | Price | 29/58 |

FOREIGN PATENTS OR APPLICATIONS

| | | |
|---|---|---|
| 996,952 | 3/1962 | Great Britain |
| 1,059,074 | 3/1964 | Great Britain |
| 1,111,133 | 4/1965 | Great Britain |
| 1,309,146 | 7/1973 | Great Britain |
| 1,317,815 | 5/1973 | Great Britain |
| 1,561,710 | 2/1969 | France |
| 2,042,495 | 2/1971 | France |

OTHER PUBLICATIONS

IEEE Proceedings, Vol. 56, Oct. 1968, pages 1748–1749, "A Cadmium Sulfide-Silicon Composite Resonator."

*Primary Examiner*—Roy Lake
*Assistant Examiner*—W. C. Tupman
*Attorney, Agent, or Firm*—Nilsson, Robbins, Bissel, Dalgarn & Berliner

[57] ABSTRACT

A method for making a semiconductor strain transducer wherein a layer of piezoelectric semiconductor material is deposited on a terminal electrode and crystallized to form a layer having strain sensitive resistivity along a direction normal to said substrate.

10 Claims, 5 Drawing Figures

METHOD FOR MAKING A SEMICONDUCTOR STRAIN TRANSDUCER

CROSS-REFERENCE TO RELATED APPLICATION

This application is a continuation-in-part of Application Ser. No. 276,269, filed July 28, 1972 and now U.S. Pat. No. 3,805,601.

BACKGROUND AND SUMMARY OF THE INVENTION

In recent years, a substantial effort has been directed toward the application of solid state technology to transducer design and fabrication. As a consequence, semiconductor strain gauges have been developed which offer considerable advantages over conventional wire and foil gauges. Specifically, the semiconductor gauges may be embodied in units of relatively small size that are rugged and highly sensitive. See for example Hollander, Jr. et al, U.S. Pat. No. 3,492,513.

Various specific forms of semiconductor strain gauges have been proposed including heterojunction diodes utilizing two distinct semiconductor members of different conductivity type. See, for example, R. Moore and C. J. Busanovich, *IEEE Proc.*, Apr. 1969, pages 735–736. Although such transducers or sensors have been quite successful, a major drawback of such devices is their limited strain sensitivity, poor temperature stability, complexity and high cost of construction. In the usual heterojunction diode, signal current increases when the diode is stretched. When attached to a substrate such as glass, the differential in expansion upon heating results in a threshold current which, together with increased thermal current, gives rise to a poor temperature stability characteristic. Also, the heterojunction devices are diodes and so must operate with a current of only one polarity.

Another type of strain sensor in current use is the high resistivity piezoelectric transducer wherein one senses the voltage induced by strain. The piezoelectric materials used in such devices include such naturally high resistance material as barium titanate and also materials such as cadmium sulfide which has been doped to a very high resistivity. The resistance is high enough so that internal charge movement under the influence of the strain induced field does not cancel out the charge induced by the strain at the electrical contacts (otherwise no voltage would be seen by the external sensing circuit). Since charge motion in the external circuit will also cancel induced charges, one must use a high input impedance detector and only time varying strains can be detected. The present invention overcomes the foregoing drawbacks and relies on a unique phenomenon to provide strain sensitive resistance operation using the piezoelectric material. Specifically, I have discovered that piezoelectric semiconductor materials can be prepared so as to have strain sensitive resistance along at least one crystal axis. For example, cadmium sulfide can be processed so as to have a highly strain sensitive resistance along the C axis. By applying a voltage across the semiconductor material parallel to the direction of strain sensitive resistance, one can measure a signal current which is proportional to strain. Thus, in contrast to devices which function piezoelectrically, static strain forces can be measured. The transducers produced by the method of this invention also have high sensitivity, as much as an order of magnitude greater than heterojunction diodes.

The transducers produced by the method of this invention also provide a signal current which is decreased when stretched and increased when compressed. Accordingly, in contrast to heterojunction diodes, thermally induced strain (resulting from expansion coefficient differentials) actually compensates for thermal current increases resulting in enhanced temperature stability. Furthermore, the transducers can be operated with an applied voltage of either polarity and with small A.C. voltages.

DETAILED DESCRIPTION

As required, detailed illustrative embodiments of the invention are disclosed herein. The embodiments exemplify the invention which may, of course, be embodied in other forms, some of which may be radically different from the illustrative embodiments disclosed. For example, the thicknesses of the layers, mode of construction and specific materials utilized may be varied. However, the specific structural and process details disclosed herein are representative and provide a basis of the claims which define the scope of the present invention.

Figure 1:
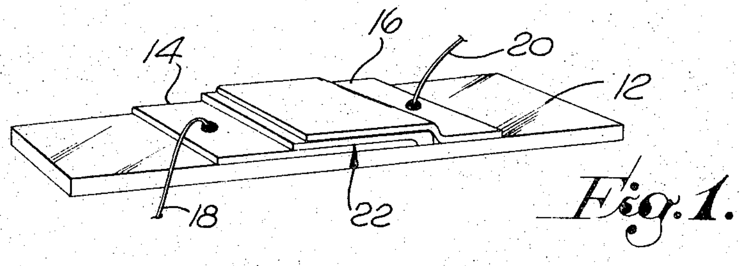
FIG. 1 is a perspective view of a strain sensor made in accordance herewith.

Referring initially to FIG. 1, the component structure of a semiconductor transducer or sensor is illustrated, constructed in accordance herewith. The sensor includes a substrate 12 that affords support and also serves to carry the strain forces that are under investigation. In one embodiment hereof, the substrate 12 comprises glass; however, other flexible materials such as molybdenum, Kapton and silicon may be also employed as the support member, the only criteria being that the material retain its dimensional stability when heat treated in accordance with the process as described below. Alternatively, the sensor can be deposited directly on the member under investigation.

The substrate 12 has two electrodes 14 and 16 supported thereon, to which terminal wires 18 and 20, respectively, are connected, as well known in the semiconductor art. A piezoelectric semiconductor layer 22 is sandwiched between the electrodes 14 and 16. It is significant at this point to appreciate that the structure 22 does not have diode characteristics. In contrast to the usual piezoelectric material, the layer 22 has piezoresistive characteristics along at least one dimension, as will be brought out in greater detail below. The electrodes 14 and 16 are placed so as to define a current path parallel to the direction of strain sensitive resistance. Thus, the structure 22 has strain sensitivity and in that regard relatively high gauge factors have been attained. Specifically, gauge factors of $10^4$ have been observed in embodiments hereof wherein the gauge factor is defined as: $G = \Delta I/IS$, with $\Delta I$ being the change in current from a nominal current $I$, upon application of an imposed strain $S$.

Figure 2:
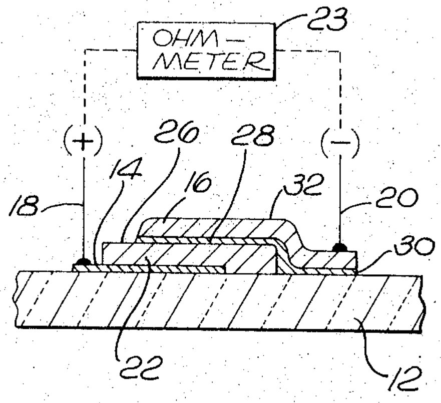
FIG. 2 is a fragmentary vertical sectional view taken centrally through the sensor of FIG. 1.

In a simple form, the transducer is constructed as shown in FIG. 1 with the layer 22 of piezoelectric semiconductor material having strain sensitive resistance along a predetermined direction. The electrodes 14 and 16 are applied across the layer 22 to define a current path parallel to such direction. A voltage is applied across the electrodes via the leads 18 and 20 while measuring the resistance with an ohmmeter 23 (FIG. 2).

For the layer 22, one can utilize any piezoelectric semiconductor material having a strain sensitive resistance along at least one direction. Operable devices can be prepared in which the resistance is strain sensitive by a gauge factor of as low as 3, but large advantages over present devices are obtained with a gauge factor of 100 or more. Suitable materials include IIB–VIA and IIIA—VA compounds, examples of which include cadmium sulfide, zinc sulfide, cadmium selenide, zinc selenide, cadmium oxide, zinc oxide, cadmium telluride, zinc telluride, aluminum nitride, gallium nitride, indium nitride, thallium nitride, aluminum phosphide, gallium phosphide, indium phosphide, thallium phosphide, aluminum arsenide, gallium arsenide, indium arsenide, thallium arsenide, aluminum antimonide, gallium antimonide, indium antimonide, thallium antimonide, and alloys thereof. It is preferred that the semiconductor material have a cubic, zinc blende crystal structure or a hexagonal, wurtzite crystal structure.

In many cases the resistance of the semiconductor material will be anisotropic with strain sensitivity found only in one direction. Particularly useful materials are those having a hexagonal wurtzite structure, such as cadmium sulfide, wherein strain sensitive resistance can be found along the C axis. In order to determine the suitability of a piezoelectric semiconductor material, one need merely apply a voltage across a portion of the material and measure the resistance thereof. A change in measured resistance caused by flexing or compressing the material will indicate whether the desired strain sensitive resistance is present along the dimension defined by the electrical contacts. Generally, a strain sensitive resistance as low as 1 ohm and as high as 50,000 ohms per square centimeter will be useful. In this regard, see *Handbook of Thin Film Technology* by Maissel and Glang, McGraw-Hill, New York, N.Y. (1970), incorporated herein by reference.

Although the mechanism by which this strain sensitive resistivity occurs is not fully understood, and without meaning to limit the invention to any particular mechanism of operation, one can hypothesize that the useful materials herein are formed with a plurality of intercrystalline grain boundaries, stacking faults or other physical discontinuities in the lattice structure and that these discontinuities are oriented along a specific direction of the crystal to give rise to the observed strain sensitivity. These discontinuities may be present as a result of various processing conditions in the formation of the crystal or may be induced in a particular semiconductor material by pre-doping with an electrically active component (which can also be called "impurities"), or such component may be subsequently diffused into the crystal.

Referring to FIG. 2, an embodiment is illustrated in which cadmium sulfide is used as the semiconductor material. In this embodiment, electronically active components are diffused through the upper surface 26 of the cadmium sulfide layer 22 to impart strain sensitivity.

Examples of materials which can be applied and then diffused into the semiconductor material to provide electronically active components include electron acceptors such as copper, silver, gold, and the like, and donors such as chlorine, bromine, iodine, indium, gallium, aluminum, and the like. The dopant can be applied to the piezoelectric semiconductor material by ion bombardment or by similar techniques well known to the semiconductor art, or may be applied to the surface as compounds and diffused into the material. Examples of compounds which can be applied include cupric chloride, cupric bromide, cupric iodide, silver chloride, silver bromide, silver iodide, gold chloride, gold bromide, gold iodide, indium chloride, indium bromide, indium iodide, gallium chloride, gallium bromide, gallium iodide, aluminum chloride, aluminum bromide, aluminum iodide, and the like. The dopant material can be applied to a thickness of about 10–100 A, from a a solution of the salt in a solvent such as methanol. For example, a 50 A thick layer of cupric chloride can be applied from a solution of 200 mg. of the chloride dissolved in 100 cc of methanol.

As indicated in FIG. 2, the layer 22 of cadmium sulfide is deposited over the electrode 14 to afford one terminal connection to the semiconductor structure 22. The opposite terminal connection, comprising the electrode 16 can be applied directly or can include a contact metal layer 30 which in turn receives a terminal layer 32. The contact layer 30 may comprise a low work function metal or alloy such as aluminum, chromium, titanium, gallium, indium, tin, alloy of tin and gold or chromium, or alloy of aluminum and titaniuum, and the like. The contact layer 30 provides ohmic contact at the upper surface 26. Gold, silver or other good conductor may be used as the layer 32, but, as indicated, this layer can also be omitted and the terminal wires 18 and 20 can be affixed directly to the metal layer 30.

The cadmium sulfide can be deposited by vacuum deposition techniques or by liquid or chemical vapor deposition. It is important to deposit the cadmium sulfide so that the C axis thereof is vertically oriented. Advantageously, this orientation is automatically obtained when the cadmium sulfide is vacuum deposited on the gold electrode 14. The cadmium sulfide is deposited to an exemplary thickness of about 2–25 microns, but somewhat thinner and thicker layers can be used. Initially, a gold electrode 14 may be deposited in a defined area on the substrate 12 using vacuum deposition techniques as well known in the prior art. Next, the cadmium sulfide layer 22 is deposited by sublimation techniques, again utilizing known vacuum deposition techniques. Such vacuum deposition techniques are particularly useful when applying cadmium sulfide to gold. Apparently, the cadmium sulfide layer adjacent to the gold electrode 14 becomes cadmium rich, furnishing a reservoir of electrons to provide good ohmic contact. See the article by B. Hall, *Journal of Applied Physics*, Volume 37, N. 13 (Dec., 1966), page 4739, incorporated herein by reference. Other deposition techniques can be used if a contact metal layer, such as 30, is interposed.

Upon completion of the cadmium sulfide layer 22, cupric chloride in solution may be sprayed onto the exposed surface of the layer 22, and permitted to dry. The cupric chloride is then diffused into the cadmium sulfide layer 22 by heating the structure at a temperature of 400°C for a few minutes. Heat treatment can be conducted at a temperature as low as 200°C but should preferably not exceed 525°C or there is danger of forming a bottom blocking contact by diffusion of cadmium donors into the bonded gold layer 14.

Finally, in accordance with the illustrative process hereof, the layers 30 and 32 are applied and contacts 18 and 20 soldered to the gold layers 14 and 32, respectively.

Figure 3:
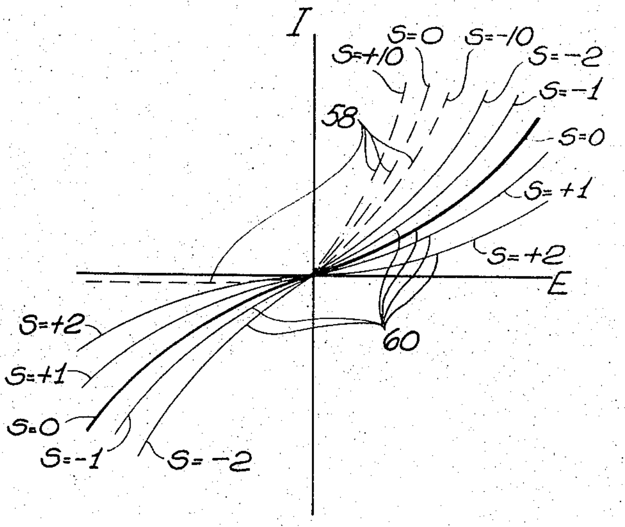
FIG. 3 is a graph schematically illustrating the voltage-signal current characteristics of the present device compared to a heterojunction diode.

Referring now to FIG. 3, there is compared the operational characteristics of a device constructed in accordance with the present invention and a heterojunction diode device of the type practiced by the prior art. In the graph, the letters S refer to strain and the numbers equated therewith are various arbitrary levels of strain which the device experiences. Positive numbers indicate the level of strain experiences when the device is stretched parallel to the surface of the substrate and the negative numbers indicate the level of strain experienced when the device is compressed. The operational characteristics of a heterojunction diode device are indicated by the dashed lines 58 whereas the operational characteristics of a device constructed in accordance with the present invention is illustrated by the full lines 60.

Referring initially to an exemplary operation of a heterojunction diode, it is seen that signal current is generated when voltage of only one polarity is applied. More importantly, when the device is stretched by ten arbitrary units, the level of signal current generated increases. On the other hand, when the device is compressed, the level of signal current decreases. When such a device is secured to a common substrate, such as soft glass, having a greater coefficient of thermal expansion than the device, any increase in temperature, as a result of thermal current increases is added to the current increase resulting from glass expansion. The result is a poor temperature stability characteristic.

Referring now to operation of the present structure, one improvement that can be seen is that the device operates equally well regardless of the polarity of the applied voltage. Thus, one has the option of using small A.C. currents for device operation allowing for simplification of ancillary components. Again more importantly, when the device is stretched, the level of signal current generated decreases; when the device is compressed, the level of signal current generated increases. Accordingly, if common substrate materials such as soft glass or steel are used, the strain induced by thermal expansion coefficient differentials, actually tends to compensate for thermal current increases, providing enhanced temperature stability. Furthermore, as illustrated a signal is obtained which compares in magnitude to that of the heterojunction diode device but at only one tenth the strain. Both the strain sensitivity and temperature stability are greater for devices of the present invention.

In a specific example a cell having an area of 1 $cm^2$ draws a current of 90$\mu a$ at 0.4 volts under zero applied strain. At a positive strain of 100$\mu s$, the current decreases to 60$\mu s$, and with a compressive strain of 100$\mu s$ the current increases to 135$\mu a$. Calculating from +100$\mu s$ to −100$\mu s$ this gives a gauge factor of more than 4,000.

As stated above, the devices of the present invention exhibit pronounced strain sensitivity with current flowing in either direction. Accordingly, upon the application of strain to the device, the current-voltage curve thereof is altered to afford an effective transducer. Very specifically, for example, the cells hereof may be connected in a bridge circuit as well known in the prior art, to which a bias voltage is applied and from which an output signal is derived that is indicative of the strain experienced by the device. A.C. or D.C. voltages of either polarity can be used in powering the bridge circuit.

Figure 4:
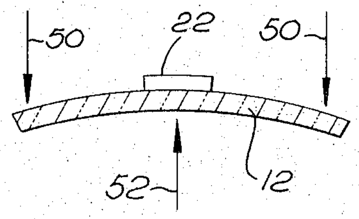
FIG. 4 is a diagram illustrating one manner of using the structure of FIG. 1.
Figure 5:
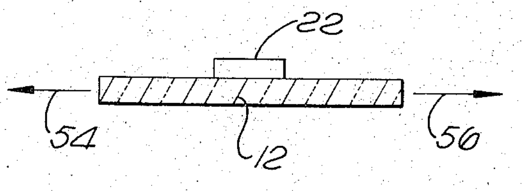
FIG. 5 is a diagram illustrating another manner of using the structure of FIG. 1.

Various techniques for loading or straining the structure are well known in the prior art; however, two exemplary arrangements are illustrated in FIGS. 4 and 5. These configurations illustrate the application of strain forces to the structure 22 and that are actually applied directly to the substrate 12. Specifically, bending forces (represented by the parallel forces 50 and an opposed, offset force 52) tend to deform the substrate 12 to place the structure 22 in tension, the strain of which is reflected in an electrical signal as described above. In FIG. 5, the substrate 12 is illustrated to receive directly-applied tension forces (indicated by the arrows 54 and 56) which result in similar tension strain within the structure 22 to again vary an electrical signal and provide a representative indication. Various techniques as well known in the prior art may be employed to apply the forces. For example, a substrate 12 may be bonded to a structural surface of concern or the transducing layer may be deposited directly onto the surface of concern if it is small enough to be treated in a vacuum system or if it is so situated that chemical vapor deposition techniques are feasible.

Various manufacturing techniques can be utilized, as well known to the art to economically simultaneously manufacture a plurality of devices. For example, gold may be deposited on an extended substrate surface and then masking techniques used to vacuum deposit circles of cadmium sulfide thereon. Thereafter, further masking technique can be used to apply the cupric chloride, ohmic contact metal layer and gold layer thereon, followed by dicing of the individual devices. By such means, a large plurality of devices can be simultaneously manufactured.

I claim:

1. A method of making a semiconductor strain transducer for measuring strain forces to be investigated, comprising the steps of:

securing a first terminal electrode on a surface of a substrate which is flexible to said strain forces;

depositing a layer of piezoelectri semiconductor material having a hexagonal wurtzite crystal structure on said first terminal electrode to form a layer having major surfaces generally parallel to said substrate surface and a strain sensitive resistivity along its C axis, in a direction normal to said surfaces, which is strain sensitive by a guage factor of at least 100, said semiconductor material having a single conductivity type along said C axis in said direction and between said major surfaces; and applying a second terminal electrode on a surface portion of said semiconductor material layer opposite said substrate to define a current path parallel to said C axis.

2. The invention according to claim 1 wherein said conductivity is determined by the step of diffusing an impurity into a surface portion of said semiconductor layer.

3. The invention according to claim 1 wherein said semiconductor material is cadmium sulfide and said conductivity is determined by diffusing a dopant into said cadmium sulfide including subjecting said cadmium sulfide layer to a temperature in the range of 200°–525°C.

4. The invention according to claim 1 wherein said step of applying said second terminal electrode comprises applying a contact metal layer having a low work function to said surface portion and applying a terminal metal layer of said contact metal layer.

5. The invention according to claim 1 wherein said semiconductor material is chosen from the group consisting essentially of cadmium sulfide, zinc sulfide, cadmium selenide, zince oxide, aluminum nitride, gallium nitride and indium nitride.

6. The invention according to claim 1 wherein said semiconductor material is cadmium sulfide.

7. The invention according to claim 6 wherein said layer of semiconductor material is deposited by vacuum sublimation.

8. The invention according to claim 1 wherein said semiconductor material is deposited by chemical vapor deposition.

9. The invention according to cliam 1 in which said layer of semiconductor material is formed to be 2–25 microns thick.

10. The invention according to claim 2 in which said impurity is diffused into said surface portion to a depth of 10–100 A along said C axis.

* * * * *